United States Patent
Coffman et al.

(10) Patent No.: US 8,611,591 B2
(45) Date of Patent: Dec. 17, 2013

(54) SYSTEM AND METHOD FOR VISUALLY TRACKING WITH OCCLUSIONS

(75) Inventors: Thayne R. Coffman, Austin, TX (US); Ronald C. Larcom, Austin, TX (US)

(73) Assignee: 21 CT, Inc., Austin, TX (US)

(*) Notice: Subject to any disclaimer, the term of this patent is extended or adjusted under 35 U.S.C. 154(b) by 511 days.

(21) Appl. No.: 12/809,443

(22) PCT Filed: Dec. 19, 2008

(86) PCT No.: PCT/US2008/013944
§ 371 (c)(1),
(2), (4) Date: Jan. 14, 2011

(87) PCT Pub. No.: WO2009/085233
PCT Pub. Date: Jul. 9, 2009

(65) Prior Publication Data
US 2011/0116684 A1    May 19, 2011

Related U.S. Application Data

(60) Provisional application No. 61/008,577, filed on Dec. 21, 2007.

(51) Int. Cl.
*G06K 9/00* (2006.01)
(52) U.S. Cl.
USPC .......... 382/103; 382/104; 382/106; 382/107; 382/154; 382/181
(58) Field of Classification Search
USPC .................. 382/103, 104, 106, 107, 154, 183
See application file for complete search history.

(56) References Cited

U.S. PATENT DOCUMENTS

| | | | |
|---|---|---|---|
| 6,674,877 B1* | 1/2004 | Jojic et al. | 382/103 |
| 7,127,083 B2* | 10/2006 | Han et al. | 382/103 |
| 7,142,600 B1 | 11/2006 | Schonfeld et al. | |
| 7,379,563 B2* | 5/2008 | Shamaie | 382/103 |
| 7,623,674 B2* | 11/2009 | Nichani et al. | 382/103 |
| 7,825,954 B2* | 11/2010 | Zhang et al. | 348/169 |
| 2003/0012409 A1* | 1/2003 | Overton et al. | 382/103 |
| 2004/0156350 A1 | 8/2004 | Brasic et al. | |
| 2006/0228002 A1* | 10/2006 | Zitnick et al. | 382/107 |
| 2006/0291693 A1* | 12/2006 | Olson et al. | 382/103 |
| 2008/0101652 A1* | 5/2008 | Zhao et al. | 382/103 |
| 2008/0166045 A1* | 7/2008 | Xu et al. | 382/170 |
| 2010/0054536 A1* | 3/2010 | Huang et al. | 382/103 |

OTHER PUBLICATIONS

Phiho, et al., "An Improved Management Model Fro Tracking Missing Features in Computer Vision Long Image Sequences," http://portal.acm.org/citation.cfm?id=1369422, 2006.
Senior, et al., "Appearance Models for Occlusions Handling," Proceedings from 2nd IEEE Int. Workshop on PETS.http://www.cvg.rdg.ac.uk/PETS2001/PETSFINALPDF/senior.pdf., Dec. 1, 2002.
International Search Report issued Apr. 23, 2009 in counterpart foreign application in the WIPO under application No. PCT/US2008/013944.

* cited by examiner

*Primary Examiner* — Michael A Newman
(74) *Attorney, Agent, or Firm* — Andrews Kurth LLP; Sean S. Wooden; Matthew J. Esserman

(57) ABSTRACT

Described herein are tracking algorithm modifications to handle occlusions when processing a video stream including multiple image frames. Specifically, system and methods for handling both partial and full occlusions while tracking moving and non-moving targets are described. The occlusion handling embodiments described herein may be appropriate for a visual tracking system with supplementary range information.

15 Claims, 6 Drawing Sheets

SYSTEM AND METHOD FOR VISUALLY TRACKING WITH OCCLUSIONS

PRIORITY DATA

This application claims the priority date of provisional application No. 61/008,577, filed on Dec. 21, 2007, and is intended to be incorporated herein by reference in its entirety for any and all purposes.

GOVERNMENT LICENSE RIGHTS

This invention was made with Government support under Contract Nos. FA8650-05-M-1865, FA8650-06-C-1010, and FA9550-07-C-0021 awarded by the United States Air Force Research Laboratory. The Government has certain rights in the invention.

BACKGROUND

Many obstacles exist for effectively tracking a target using a visual tracking system. Occlusions are one type of obstacle that presents problems for current visual tracking systems. An occlusion is something that obstructs or blocks the visual tracking systems' view of a target that is being tracked. An occlusion may obstruct part of (a partial occlusion) or all of (a total occlusion) the target being tracked. Being able to effectively track a target that is partially or totally occluded is a problem for current visual tracking systems.

BRIEF DESCRIPTION OF THE DRAWINGS

Exemplary embodiments of a method for visually tracking with occlusions will be described in detail with reference to the following figures, in which like numerals refer to like elements, and wherein.

SUMMARY

Figure 1:
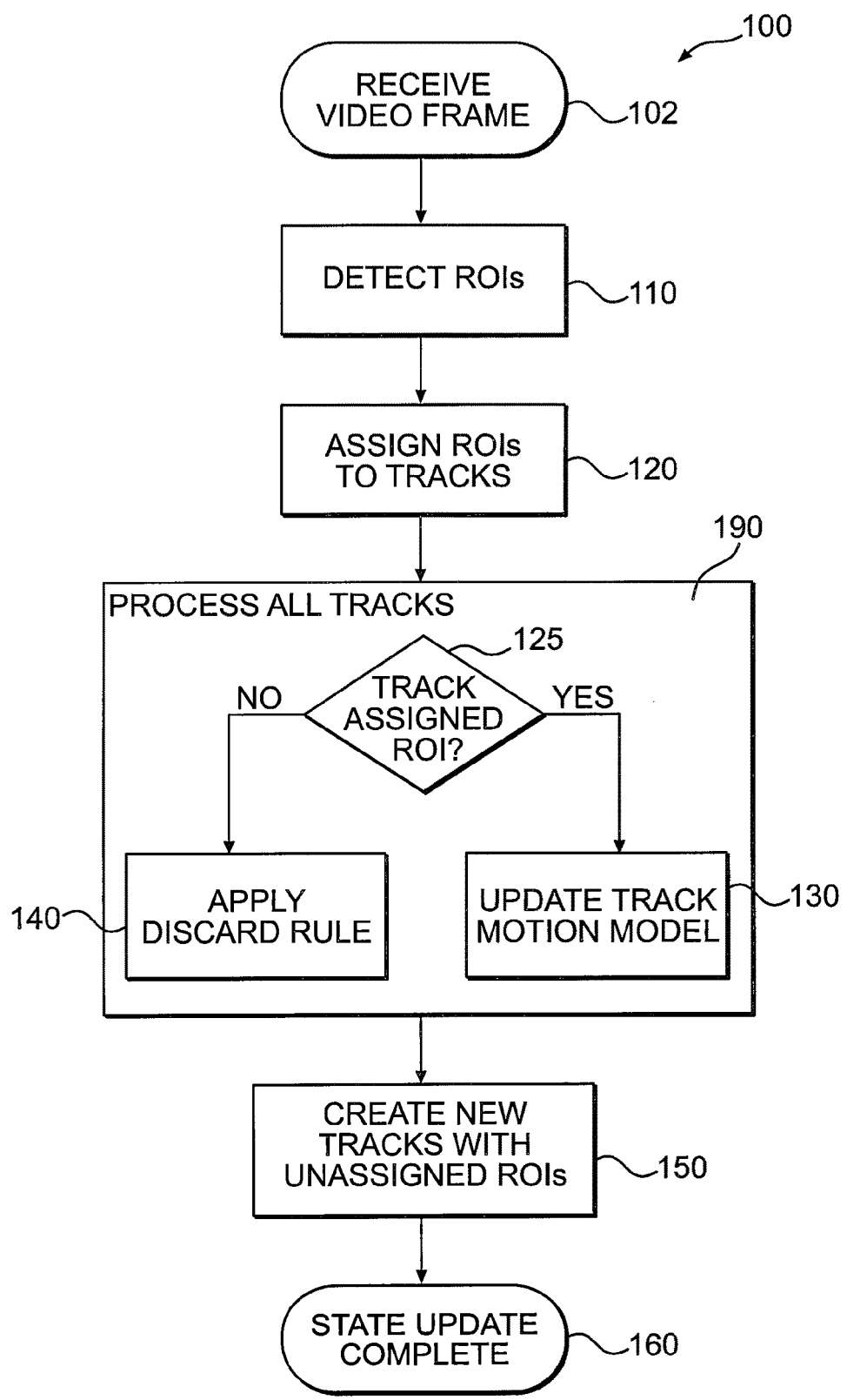
FIG. 1 is a flow chart illustrating an exemplary visual tracking algorithm in a visual tracking system to process imagery in a new video frame without the benefit of occlusion handling.

Embodiments of the system and method for visually tracking with occlusions overcome the disadvantages of the prior art described herein. These advantages are provided by a method of visually tracking targets in which full occlusions of the targets are encountered, and a system and computer readable medium including instructions for executing the method, that includes identifying target regions in an image, assigning target regions with old tracks and assigning target regions with new tracks, detecting and identifying fully occluded tracks, modifying track discard rules for tracks identified as fully occluded in order to maintain the occluded tracks for a greater duration of unassigned target regions, adjusting a motion model used to predict tracks identified as fully occluded to maintain the occluded tracks along a last observed path of the occluded tracks and gradually increase a prediction uncertainty, and deciding which tracks to maintain and which tracks to discard.

These advantages are also provided by a method of visually tracking targets in which partial occlusions of the targets are encountered, and a system and computer readable medium including instructions for executing the method, that includes identifying target regions in an image, assigning target regions with old tracks and assigning target regions with new tracks, in which a centroid estimation is utilized, identifying partially occluded target regions, revising the centroid estimation based on the identified partially occluded target regions, and deciding which tracks to maintain and which tracks to discard.

These advantages are also provided by a method of visually tracking targets in which occlusions of the targets are encountered, and a system and computer readable medium including instructions for executing the method, that includes identifying occluded target regions in an image, assigning target regions with old tracks and assigning target regions with new tracks, applying a centroid estimation by observing a target's current position, revising the centroid estimation based on the identified occluded target regions, and deciding which tracks to maintain and which tracks to discard.

These advantages are also provided by a method of visually tracking targets in which occlusions of the targets are encountered, and a system and computer readable medium including instructions for executing the method, that includes identifying target regions in an image, assigning target regions with old tracks and assigning target regions with new tracks, determining if a track is assigned a target region, if the track is assigned a target region, determining if the target region is partially occluded, and if yes, adjusting a centroid estimation, and if the track is not assigned a target region, identifying the track as fully occluded, determining if a predicted location is occluded, and modifying track discard rules for the track identified as fully occluded.

DETAILED DESCRIPTION

Described herein are tracking algorithm modifications to handle occlusions when processing a video stream including multiple image frames. Specifically, systems and methods for handling both partial and full occlusions while tracking moving and non-moving targets are described. The occlusion handling embodiments described herein may be appropriate for a visual tracking system with supplementary range information.

An exemplary visual tracking algorithm may identify target regions within a stream of input images, and associate target regions across video frames. FIG. 1 is a flow chart illustrating an exemplary method 100 that uses the exemplary visual tracking algorithm in a visual tracking system to process a new video frame. After receiving the video frame (block 102), for each new image, the exemplary method 100 identifies target regions in the image, i.e., Regions of Interest (ROIs), (block 110) and assigns target regions with old or new tracks (block 120).

In block 120, an association algorithm uses a motion model to assign the target regions. An exemplary embodiment is a variant of the Multiple Hypothesis tracking (MHT) algorithm, described in, for example, D. Reid, "An Algorithm for Tracking Multiple Targets," *IEEE Transactions on Automatic Control*, December 1979. Old tracks, which are composed of a series of ROIs extracted from earlier images, may predict a location in the current video frame. The ROIs form a track because these ROIs have been associated with each other and are considered to be caused by a single target. Predicting a location may be done by approximating ROI location with the region's centroid (i.e., an observation of the target's current position, which is the primary piece of state the visual tracking system cares about) and applying a Kalman filter with a state consisting of centroid location in each dimension, and time derivatives of the location (velocity, and possibly acceleration). The Kalman filter described below may estimate the value of a normally distributed state variable.

$$X \sim N(\overline{X}, P) \quad \quad 1$$

where X, the state variable, represents expected target location, velocity, and possibly acceleration in world coordinates, a random variable with distribution described by the normal function N with mean $\overline{X}$ and covariance P. The estimate is governed by a linear update equation and a linear measurement equation relating the state (X) to an observation (Z) either of or related to the current target state. In most cases, the estimate is the centroid of the ROI, which is an observation of the target's current position.

$$X_N = AX_{N-1} + w \quad \quad 2$$

$$w \sim N(0, Q) \quad \quad 3$$

$$Z_N = HX_N + v \quad \quad 4$$

$$v \sim N(0, R) \quad \quad 5$$

where A is the state transition matrix, w is the process noise, Q is the process noise covariance, H is the measurement matrix, v is the measurement noise, and R is the measurement noise covariance. The variables v and w are random variables with normal distributions of 0 mean and covariance of Q and R respectively. A prediction of the track's state at current discrete time N ($X \sim N(\tilde{X}_N, \tilde{P}_N)$) may be obtained by first applying the update equation (Equation 2) to the previous state estimate $X_{N-1}$. This is called the a priori estimate using the update equation.

$$X_N^- \sim N(AX_{N-1}, AP_{N-1}A^T + Q) \quad \quad 6$$

New ROIs are compared to the predictions, and depending on their degree of proximity and similarity are assigned a cost value based on the inverse likelihood that the ROI was generated by the hypothetical target modeled by each track. The assignment algorithm computes a minimal cost solution(s) to the ROI to track assignment problem. ROI are either assigned to an old track or used to create a new track. Tracks may or may not be assigned an ROI. The assignment may be done by a cost minimization algorithm, such as the Primal-Dual assignment algorithm described, for example, in Jørgen Bang-Jensen and Gregory Gutin, *Digraphs: Theory, Algorithms and Applications*, Springer Verlag, London, 2000. In the case of the exemplary MHT algorithm, multiple solutions may be generated, each representing a distinct hypothesis regarding the underlying number and position of targets generating observations. As multiple time steps are processed, hypotheses are validated or refuted based on the degree to which their hypothesized tracks continue to successfully predict future ROI locations.

Referring to FIG. 1, the method 100 processes all tracks (block 190) by checking if the tracks are assigned ROIs (block 125). If yes, the method 100 updates the tracks assigned target regions by updating the motion model, i.e., track motion model (block 130). If the tracks are not assigned ROIs (block 125), the method 100 applies a discard rule to decide which tracks to maintain, and which ones to discard (block 140). The method 100 may create new tracks from unassigned ROIs (block 150) before completing the update of the track state (block 160).

In block 130, the track state may be updated by using the newly associated target region. In the case of the Kalman filter discussed above, this means applying the state measurement update equations. The associated target region may be converted to a measurement, $Z_N$ the centroid location, and the track state may be updated based on the measurement uncertainty, prediction uncertainty, and the error between the prediction and measurement. The final estimate may be calculated by adding a weighted sum of the measurement error, which is the difference between the observation and the a priori estimate.

$$\tilde{X}_N = \tilde{X}_N^- + K_N(Z_N - H\tilde{X}_N^-) \quad \quad 7$$

$K_N$ is a scaling factor calculated from the process noise, measurement noise, and state covariance matrices Q, R, and P.

In block 140, the method 100 may apply a simple rule, e.g., if a track meets a minimum number of ROIs, it is allowed to not be assigned any ROIs for N consecutive images before it is discarded. If a track has less than the minimum number of ROIs it is discarded immediately upon not being assigned an ROI. If a track is not discarded, its motion model is updated. No measurement is available to adjust the a priori estimate, so that the estimate may be maintained for the next iteration (N+1), at which point a new update estimate is made.

$$X_{N+1}^- \sim N(A\tilde{X}_N^-, AP_N^- A^T + Q) \quad \quad 8$$

$$X_{N+1}^- \sim N(AA\overline{X}_{N-1}, AAP_{N-1}A^T A^T + AQA^T + Q) \quad \quad 9$$

Equations 6 and 9 may be used to derive an equivalent update equation for twice the time step, or for any integral number of time steps.

$$X_N = A_2 X_{N-2} + w_2 \quad \quad 10$$

$$A_2 = A^2 \quad \quad 11$$

$$w_2 \sim N(0, AQA^T + Q) \quad \quad 12$$

$$X_N = A_M X_{N-M} + w_M \quad \quad 13$$

$$A_M = A^M \quad \quad 14$$

$$w_m \sim \sum_{m=1}^{M} A^{m-1} Q A^{m-1 T} \quad \quad 15$$

Since Q is a positive semi-definite matrix, the update equation covariance grows with each successive missed time step, hence the target state estimate becomes more and more uncertain as the track is maintained for more time steps without being assigned a target region.

Figure 2:
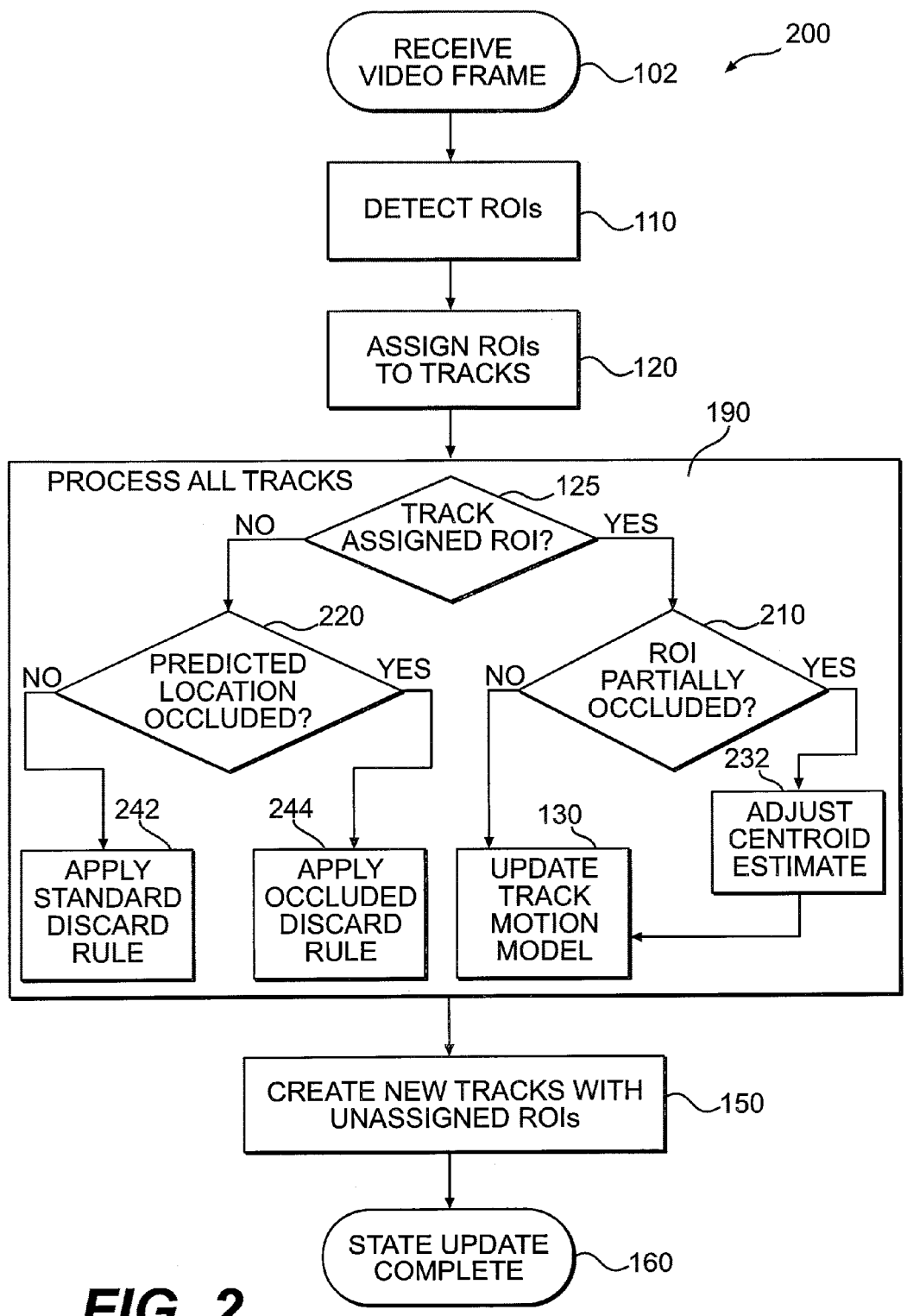
FIG. 2 is a flow chart illustrating an improved exemplary method that modifies the visual tracking system of FIG. 1 to visually track in the presence of occlusions.

The process of discarding tracks after a period of certain duration with no observations, implemented by the method 100 in block 140 described above, is needed to reduce the number of clutter or false alarm tracks, as well as to maintain efficient processing of the tracking algorithm. When a tracked target temporarily passes behind an occlusion, its track is discarded and a new track is assigned when the target emerges and once again becomes visible. This situation degrades the overall average duration for which the system correctly associates a target with a single track, which is an important performance metric. FIG. 2 is a flow chart illustrating an improved exemplary method 200 that modifies the visual tracking system of FIG. 1 to visually track in the presence of occlusions. Specifically, the occlusion handling technique applied by the exemplary method 200 modifies the algorithms used in blocks 130 and 140 to increase the likelihood that a single track is maintained when a real target becomes temporarily occluded. The method 200 may be appropriate for visual tracking systems in which supplemental range information is available, such as the knowledge of the distance between the observed scene and the sensor focal plane. The range information may be provided by computational stereo algorithms applied to stereo sensors or as a structure from motion, or from an additional sensor modality such as light detection and ranging (LIDAR). Exemplary computational stereo algorithms are described, for example, in T. Coffman and A. C. Bovik, "Fast computation of dense stereo correspondences by stochastic sampling of match quality," *Proc. IEEE International Conference on Acoustics, Speech, and Signal Processing*, Las Vegas, Mar. 30-Apr. 4, 2008C. L. Zitnick and T. Kanade, "A Cooperative Algorithm for Stereo Matching and Occlusion Detection" *Proc. IEEE Trans. Pattern Analysis and Machine Intelligence*, vol. 22, no. 7, July 2000.

Occlusions may be divided into two categories: partial occlusions and full occlusions. When a target is partially occluded it may still generate an ROI. However, the full target is not visible, and the ROI is smaller than the actual target size. Therefore, the ROI centroid may not correctly represent the center of the target. A fully occluded target may not generate any ROI. The target's track may not be assigned an ROI, and may possibly be discarded. In many visual tracking applications, a target may experience a period of partial occlusion before and after a period of full occlusion. The method 200 described herein handles each type of occlusion separately in the track processing step 190 of FIG. 1. Specifically, the track processing step 190 of FIG. 1 is modified in the method 200 of FIG. 2. The modified track processing step is shown in detail in FIG. 2.

In the case that a track is not assigned an ROI (block 125), the track is processed for potential full occlusions. Specifically, the method 100 determines if the predicted location is occluded (block 220). If yes, the method 100 applies an occluded discard rule (block 244), and if not, the method 100 applies a standard discard rule (block 242). A process for handling full occlusions is described in detail below with respect to FIG. 3.

In the case that a track is assigned an ROI (block 125), the track is processed for potential partial occlusions. Specifically, the method 200 determines if the ROI is partially occluded (block 210). If yes, the method 200 adjusts the Centroid estimate (block 232), and if not, the method 200 updates the track motion model (block 230). A process for handling partial occlusions is described in detail below with respect to FIG. 5.

Full Occlusions

Figure 3:
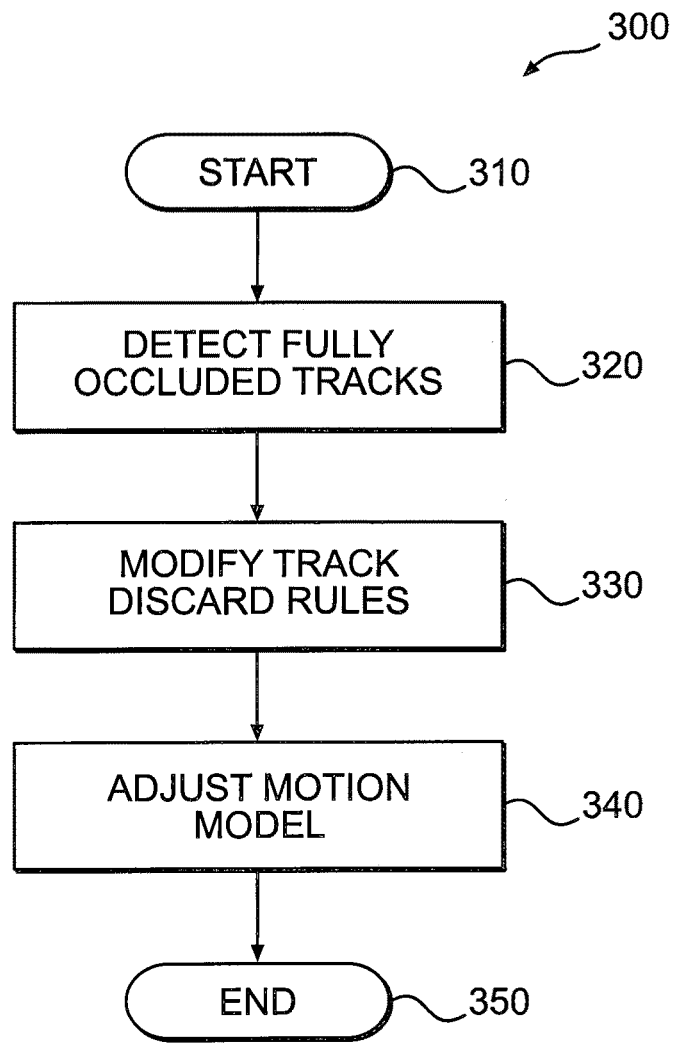
FIG. 3 illustrates in detail several steps of FIG. 2 with respect to full occlusions.

FIG. 3 illustrates in detail steps 220, 242, and 244 of FIG. 2 with respect to full occlusions. Specifically, FIG. 3 shows an embodiment of an occlusion handling method 300 for full occlusions. The method 300 starts 310 by detecting fully occluded tracks (block 320). The method 300 then modifies track discard rules for tracks identified as occluded in order to maintain them for a greater duration of unassigned ROIs (block 330). The method 300 then adjusts the motion model used to predict tracks identified as occluded to maintain them along their last observed path and gradually increase the prediction uncertainty (block 340). The information being used to predict the target's future position gets more and more out of date as the duration of the occlusion grows. Therefore, over time there is less and less certainty about where the target is located. Each of these steps of method 300 is now described in greater detail below.

In block 320, fully occluded tracks are detected after the assignment phase of block 120. All unassigned tracks are evaluated for occlusion in block 220 (shown in FIG. 2). The track's motion model may be used to determine the predicted position in the input image, and the predicted range to the target. The predicted range to the target is compared with the range information for the predicted position in the input image (the range to scene). If the range to scene is more than a threshold less than predicted range to target, it indicates that there is an object between the sensor and the target. The track is then identified as occluded.

The available range data is of the form R(r,c), where R(r,c) is the distance along the frustum of the video sensor pixel corresponding to the image location I(r,c) from the sensor focal point to the scene. The target motion model describes the predicted target location as a distribution $X \sim N(\tilde{X}_N, \tilde{P}_N)$. X is a three dimensional quantity, locating the target in space. Using camera calibration information, X may be projected to create a distribution in projective 2 space $$x = \begin{bmatrix} r \\ c \\ w \end{bmatrix} = C \begin{bmatrix} X \\ 1 \end{bmatrix},$$

$$x \sim N(\tilde{x}_N, \tilde{p}_N),$$

where C is the camera projection matrix. The projective coordinate (r,c,w) is a homogeneous coordinate, and may be interpreted as an image location (r,c), and a distance w along the corresponding ray through the sensor focal point. The method 200 compares the coordinate w with the range data R(r,c). An exemplary comparison rule is provided below:

$$\text{Occlusion} = P_{thresh} < \max_{r,c} P(w > R(r, c) \mid r, c, \tilde{x}, \tilde{p})$$

Where $P_{thresh}$ is a probability threshold selected to meet desired performance characteristics. Comparing the distribution mean to a local neighborhood is an alternative approximation:

$$\text{Occlusion} = R_{thresh} > \max_{r,c \in N_{local}} ([0\ 0\ 1]\tilde{x} - R(r, c))$$

where (r,c) is constrained to local neighborhood $N_{local}$. $R_{thresh}$ is a range threshold, the minimum length of range disparity that is considered a potential occlusion.

In block 330, when a track has been identified as occluded in block 220 (shown in FIG. 2), a rational explanation may exist for why the track is no longer being assigned ROIs, and it is a reasonable expectation that the same target may later emerge from behind the occlusion. Therefore, the period of leniency before an occluded track is discarded should be greater than the period given to tracks which inexplicably cease to be assigned ROIs. To accomplish this, the method 300 may use a second, greater threshold in the case of occluded tracks in block 244 (shown in FIG. 2) (as opposed to the threshold applied using the standard discard rule in block 242 (shown in FIG. 2)). For some systems, a reasonable threshold may be derived from the adjusted motion model.

In block 340, another step in handling completely occluded targets is to adjust the motion model used to predict its location at future times so that it predicts the target continuing along its last observed track, and gradually increases the uncertainty of its prediction. Making this adjustment for a system using a Kalman filter motion model follows the process described above. The method 300 may end at 350.

In many systems, assignments are based on comparing the relative probability of an ROI matching a motion model's prediction with a threshold probability (or the probability of clutter) at which the ROI is assigned to a new track. In this case, a reasonable value for the time threshold at which occluded tracks are discarded may be obtained.

Consider a track X which at time N is estimated to have the distribution $N(0, P_N)$, that is, the motion model predicts it will occur at the origin. For a point Z to be in the search area its probability must be greater than the clutter probability ($P_{Clutter}$) (e.g., the probability that an erroneous non-target ROI will be generated by the ROI identification algorithm).

$$p(Z_N \mid X_N^-) > P_{Clutter} \qquad (16)$$

$$p(Z_N \mid X_N^-) \sim N(H\overline{X_N}, HP_N^- H^T) \sim N(0, \Sigma_N) \qquad (17)$$

$$p(Z \mid X) = \frac{1}{2\pi^{3/2} |\Sigma|^{1/2}} e^{-\frac{1}{2} Z^T \Sigma^{-1} Z} \qquad (18)$$

where $\Sigma$ represents the expected observation covariance. For simplicity, consider $\Sigma$ a 3×3 diagonal matrix. Equation 16 may be solved for the boundary condition.

$$\Sigma_N = \begin{bmatrix} \sigma_1^2 & 0 & 0 \\ 0 & \sigma_2^2 & 0 \\ 0 & 0 & \sigma_3^2 \end{bmatrix} \qquad (19)$$

$$\frac{1}{2\pi^{3/2} \sigma_1 \sigma_2 \sigma_3} e^{-\frac{1}{2}\left(\frac{Z_1^2}{\sigma_1^2} + \frac{Z_2^2}{\sigma_2^2} + \frac{Z_3^2}{\sigma_3^2}\right)} \geq P_{Clutter} \qquad (20)$$

$$\frac{Z_1^2}{\sigma_1^2} + \frac{Z_2^2}{\sigma_2^2} + \frac{Z_3^2}{\sigma_3^2} \leq -2(\log(2\pi^{3/2} P_{Clutter}) + \log(\sigma_1 \sigma_2 \sigma_3)) \qquad (21)$$

Equation 21 describes a bounding ellipsoid in state space. As the state estimate variances increase the ellipsoid's volume first expands, then contracts as the right hand side of Equation 21 shrinks to zero. The contraction is due to the increased motion model uncertainty—eventually more and more points fall below the clutter probability threshold. If the three covariance terms are equal, the search area is a sphere.

$$A = \pi R^2 = \pi \sigma^2 (-2\log(2\pi^{3/2} P_{Clutter}) - 6\log(\sigma)) \qquad (22)$$

$$\frac{dA}{d\sigma} = -4\pi\sigma \log(2\pi^{3/2} P_{Clutter}) - 12\pi\sigma \log(\sigma) - 6\pi\sigma \qquad (23)$$

$$\sigma_I = e^{-1/2} (2\pi^{3/2} P_{Clutter})^{-1/3} \qquad (24)$$

It is reasonable to maintain an unobserved occluded track until its search area begins to contract (the inflection variance in Equation 24). Since the state covariance grows in a predictable manner (Equation 15), the number of missed observations until the condition of Equation 24 is met may be solved for. Other rules may also be applied.

Partial Occlusions

Figure 4:
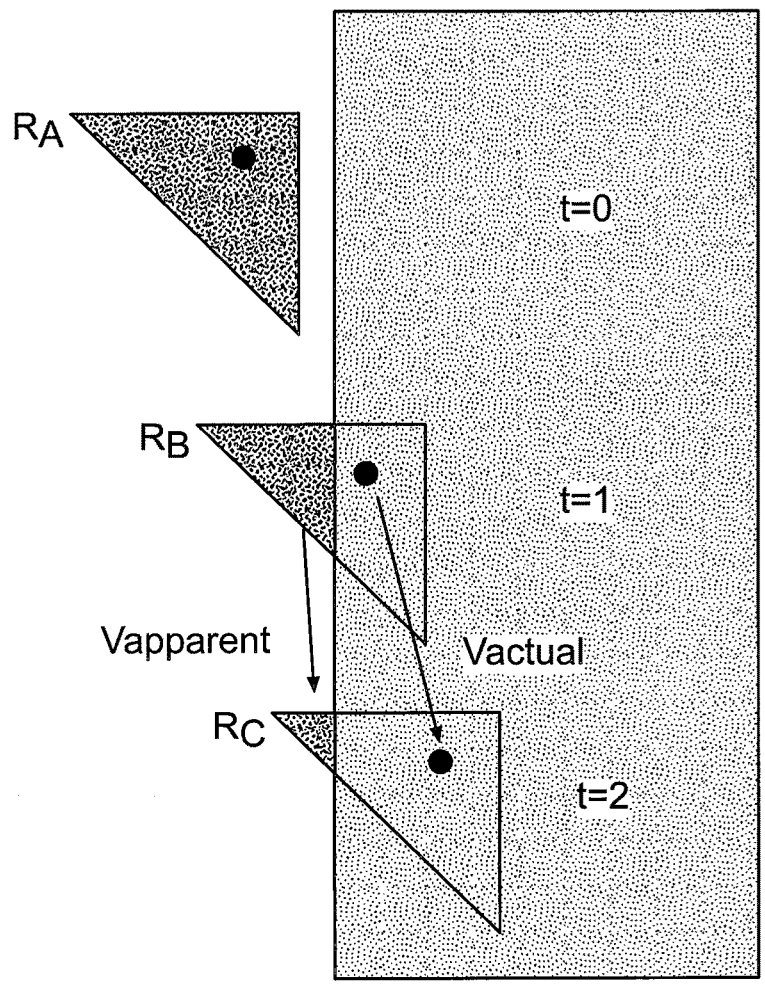
FIG. 4 shows a triangular shape approaching an occlusion and velocity errors that may be introduced.

Partial occlusions are problematic in that tracking the ROI centroid does not accurately represent the actual target motion. While the positional errors may be small enough to be ignored, velocity errors are also introduced, as shown in FIG. 4. FIG. 4 shows a triangular shape approaching an occlusion and velocity errors that may be introduced. The full occlusion handling technique described above relies upon having an accurate motion model to extend through the period of occlusion. Therefore, the partial occlusion handling technique eliminates the perceived velocity error.

Figure 5:
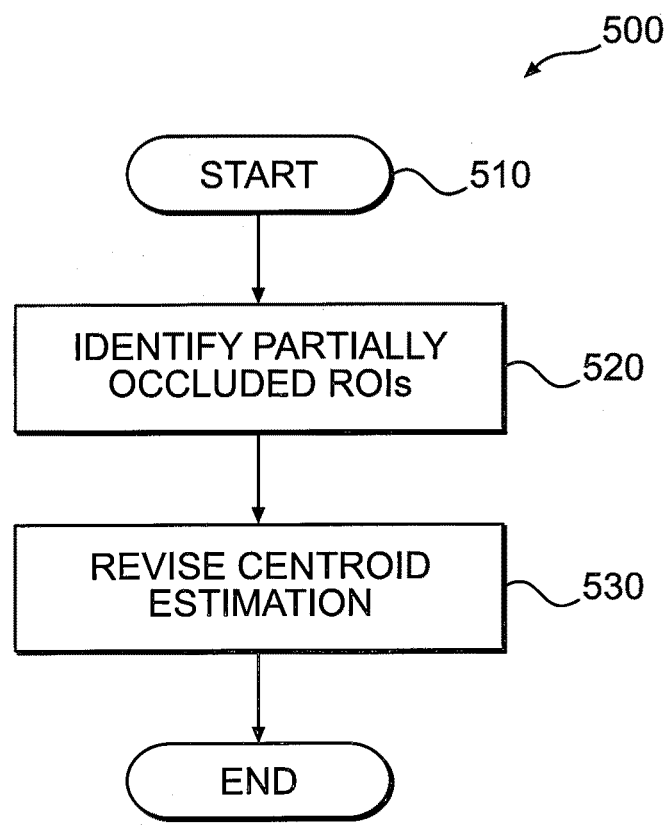
FIG. 5 illustrates in detail several steps of FIG. 2 with respect to partial occlusions.

FIG. 5 illustrates in detail steps 210 and 232 of FIG. 2 with respect to partial occlusions. Specifically, FIG. 5 shows an embodiment of a method 500 for a partial occlusion handling technique. The exemplary method 500 starts 510 by identifying partially occluded ROIs (block 520). The method 500 then revises centroid estimation (block 530) and ends at 540. Each step is described in greater detail below.

In block 520, the method 500 identifies partially occluded ROIs (block 210, shown in FIG. 2) by testing all ROIs after they have been assigned to a track, and before the track's motion model has been updated to account for the new observation.

ROIs describe a collection of image pixels that have been identified as containing a target. To detect partial occlusions the method 500 considers range information for a ring of pixels surrounding the ROI. To select these ROI neighbor pixels, the method 500 grows the ROI using morphological image processing operators (see, e.g., P. Maragos, "Morphological Filtering for Image Enhancement and Feature Detection," in A. C. Bovik, ed., *Handbook of Image & Video Processing*, $2^{nd}$ ed., pp. 135-156, Elsevier Academic Press, 2005), and then removes the original ROI pixels. The method 500 defines range to scene to be the minimum distance to any of the ROI neighbor pixels using the available range information. If range to (ROI—range to scene) exceeds the threshold, then the method 500 identifies the ROI as partially occluded (block 210, shown in FIG. 2).

The ROI is a binary function indicating target visibility at image pixel (r,c):

$$ROI(r, c) = \begin{cases} 0, & \text{background} \\ 1, & \text{target} \end{cases}$$

The method 500 forms the shell around the ROI using dilation:

$$S(r,c) = \text{Dilation}(ROI(r,c)) - ROI(r,c)$$

The structuring element used in the dilation operation is selected based on the average target size. A common element is a square with side length equal to half the expected maximum linear dimension of a target.

The comparison is similar to that of a fully occluded target, based on range data R(r,c) and projective target location x.

$$x = \begin{bmatrix} r \\ c \\ w \end{bmatrix} = C \begin{bmatrix} X \\ 1 \end{bmatrix},$$

$$x \sim N(\tilde{x}_N, \tilde{p}_N)$$

X used above is obtained by updating the target motion model using the current ROI centroid. The target range w is compared to range in the ROI shell.

$$PartialOcclusion = R_{thresh} < \max_{r,c \in S}(\tilde{w} - R(r, c))$$

In block 530, the method 500 revises the ROI Centroid estimation (block 232, shown in FIG. 2) by determining target movement using the most recent ROI from previous images and the partial ROI in the current image. The method 500 determines a general translation vector that describes the target movement, and creates a new vehicle position measurement by applying the estimated translation to the previous ROI's centroid.

To correct the partial image registration problem, the goal is to register the partially occluded ROI with the previous ROI, using only target image pixels, and not background image pixels. The approach used in the embodiment of method 500 is to use an exemplary algorithm, such as the Lucas-Kanade-Tomasi tracking algorithm (LKT), on masked target images. Using Baker and Matthews' terminology [see S. Baker, I. Matthews, "Lucas-Kanade 20 Years On: A Unifying Framework," *International Journal of Computer Vision*, Vol. 56, No. 3, pp. 221-255, March, 2004], method 500 may restrict the range over which the error and descent images are accumulated to only include those points at which both the template (previous ROI) values are masked and the warped input image (current partially occluded ROI) values are masked.

$$\Delta p = H^{-1} \sum_{x'} \left[\nabla T \frac{\partial W}{\partial p}\right]^T [I(W(x; p)) - T(x)] \qquad 25$$

$$H = \sum_{x'} \left[\nabla T \frac{\partial W}{\partial p}\right]^T \left[\nabla T \frac{\partial W}{\partial p}\right] \qquad 26$$

$$x' \in X: M_T(x') = 1, M_I(W(x'; p)) = 1 \qquad 27$$

In the above equations, T represents the template image (previous image), I represents the input image (current image), $M_T$ and $M_I$ represent the template and input ROI masks (0=background pixel, 1=ROI pixel), X represents the domain of the template image, and W represents an image warp. The warp W defines an image transformation appropriate to the tracking task. The two most common warps are a translation and rotation (shown in Equation 28), or a simple translation (shown in Equation 29).

$$W(x; p) = \begin{bmatrix} \cos(p_3) & -\sin(p_3) \\ \sin(p_3) & \cos(p_3) \end{bmatrix} \begin{bmatrix} x_1 \\ x_2 \end{bmatrix} + \begin{bmatrix} p_1 \\ p_2 \end{bmatrix} \qquad 28$$

$$W(x; p) = \begin{bmatrix} x_1 \\ x_2 \end{bmatrix} + \begin{bmatrix} p_1 \\ p_2 \end{bmatrix} \qquad 29$$

The latter warp W is used in the exemplary embodiment due to its lower computational complexity.

Restricting the Hessian matrix H to the masked regions may lead to unstable or singular matrices when either of the masked regions are particularly small. The track should be treated as fully occluded after the assigned ROI size falls below an appropriate threshold.

Once warp parameters that minimize sum of squared error between T(x') and I(W(x';p)) have been solved for, the warp W may be specifically applied to the previous ROI centroid to obtain a new centroid observation. The new centroid observation may be used in place of the partially occluded ROI's centroid as input to the motion model. Other algorithms that register the partially occluded ROI with the previous ROI may be used.

Figure 6:
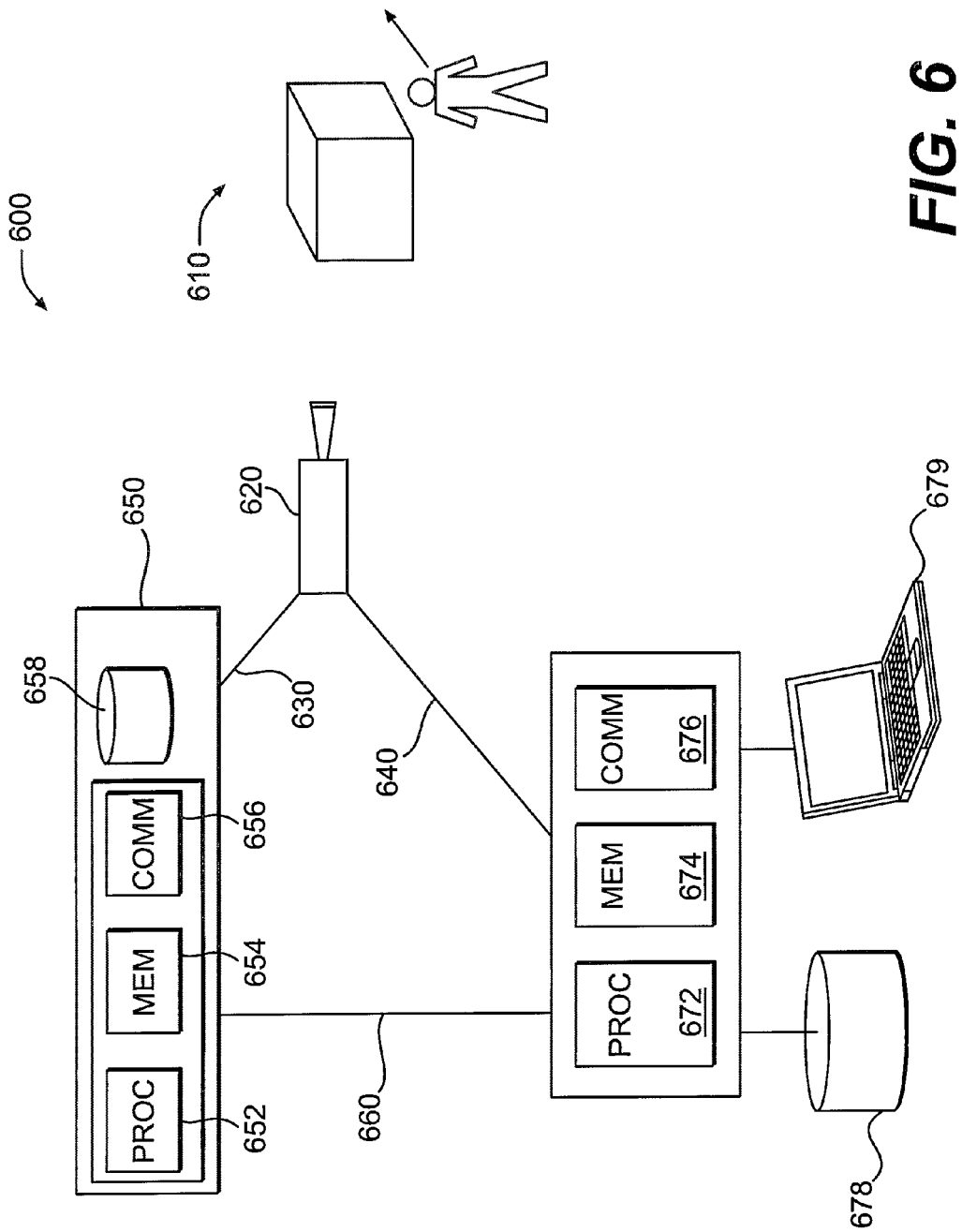
FIG. 6 illustrates a high-level view of components of an exemplary system for target tracking in the presence of occlusions.

FIG. 6 illustrates a high-level view of components of an exemplary system 600 for target tracking in the presence of occlusions, comprising a visual sensor 620, a computing device 670 and a platform 650. The system illustrated in FIG. 6 derives range information using structure from motion techniques.

Also depicted in FIG. 6 is a three-dimensional scene 610. The three-dimensional scene 610 may include any scene containing three-dimensional objects and targets moving along a ground plane. An exemplary and non-limiting list of examples includes: vehicles driving through an urban environment; pedestrians in an airport, plaza, mall, or other gathering area; and ships traveling near a city or port.

The visual sensor 620 includes an sensor that may produce a 2D image of a 3D object and includes passive staring visual sensors such as, for example, the common visible-light camera and video camera and other sensors that capture images in the visible light spectrum, and electro-optic (EO) sensors that operate on other wavelengths like infrared, ultraviolet, multispectral, or hyperspectral. The visual sensor 620 may be adapted and configured to transmit live images in real time or to store images (such as on digital video tape, flash memory or other media) for non-real-time processing. Each visual sensor 620 will have associated intrinsic parameters (e.g., focal length, resolution, field of view, principal point, skew, radial distortion, et cetera) and extrinsic parameters (e.g., absolute position in terms of global positioning system (GPS), and orientation), which preferably are monitored and stored in the system 600.

The system 600 includes the visual sensor 620. The methods described herein work by analyzing a 2-D range image representing the distance between objects in the three-dimensional scene 610 and the visual sensor 620. The range image is generated by structure from motion techniques which apply computational stereo algorithms to two images from the visual sensor 620 generated at different times. A stereo baseline, or separation of viewpoints, is created by the motion of the platform 650. The two or more different images may be captured by a single (monocular) visual sensor which is displaced, relative to the three-dimensional scene 610, in time and/or space, such as, for example, a single video camera mounted on an unmanned surveillance drone that captures a stream of video image frames of an object during a flyover. Preferably any visual sensors used as a monocular visual sensor are adapted and configured to generate sequential 2-D image frames with incremental changes in viewpoints such as would be generated, for example, by a video camera.

The system 600 includes one or more computing devices 670 preferably implemented as a general-purpose computing device in the form of a computer comprising one or more processing units 672, a system memory 674 comprising computer storage media, a communications unit 676, an optional storage device 678 and a display device 679, and a system bus that couples the various system components including the system memory 674 to the processing units 672.

The system 600 optionally includes a platform 650. The platform 650 preferably comprises one or more computing devices 651 comprising one or more processing units 652, a system memory 654 comprising computer storage media, a communications unit 656, an optional storage device 658 comprising computer storage media, and a system bus that couples the various system components including the system memory 654 to the processing units 652.

Alternatively the computing devices 670 and 651 may be implemented as a special-purpose computer designed to implement the methods for fast dense stereoscopic ranging described herein.

The selection and conglomeration of the components of the computing device 670 and platform 650 is within the knowledge of the person of ordinary skill in the art. What follows is a non-limiting description of exemplary embodiments of the system components.

The computing devices 670 and 651 typically include a variety of computer readable media. Computer readable media can be any available media that can be accessed by computer and includes both volatile and nonvolatile media, removable and non-removable media. Computer readable media provide storage of software, computer readable instructions, data structures, program modules and other data for the computer, including an operating system, application programs, other program modules and program data. By way of example, and not limitation, computer readable media may comprise computer storage media and communication media.

The phrase "computer storage media" is intended to include both volatile and nonvolatile, removable and non-removable media implemented in any method or technology for storage of information such as computer readable instructions, data structures, program modules or other data. Computer storage media includes, but is not limited to, RAM, ROM, EEPROM, USB drives, memory sticks, flash memory or other memory technology, CD-ROM, digital versatile disks (DVD) or other optical disk storage, magnetic cassettes, magnetic tape, hard disks, magnetic disk storage or other magnetic storage devices, or any other medium that can be used to store the desired information and which can be accessed by the computer.

The term "communication media" typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as satellite, microwave, acoustic, RF, infrared and other wireless media. Combinations of any of the above should also be included within the scope of computer readable media.

The processing units 672 and 652 may include one or more conventional processors, configured in a single-core or multi-core arrangement. Alternatively, the computing devices 670 and 651 may include multiple processors configured to operate in parallel; indeed, the methods described herein are well-suited to parallel implementation because use of nonlocal methods (such as inhibition) may be avoided or minimized in embodiments.

The system memories 674 and 654 preferably comprise RAM and/or other computer storage media coupled to the processor(s) 672 and 652 and adapted and configured for storing the software instructions embodying the methods (e.g., methods 100-500) described herein, the data used in the methods, including the per-pixel estimated range metrics and other meta-data regarding each pixel of frame data, intrinsic and extrinsic parameters of the visual sensors 620, and other information used in the system. Preferably there is sufficient memory to simultaneously store all estimated range metric estimations for at least two iterations of the methods. In a typical embodiment, processor 672 and 652 execute these software instructions to implement and perform the methods described and illustrated herein.

The communications modules 676 and 656 comprise communications media including but not limited to the hardware and software required to implement the communications protocols used to communicate and to exchange data with the visual sensors 620, the computing device(s) 670, and/or the platform 650. Exemplary communications protocols supported by the communications module 676 and 656 include TCP/IP, HTTP, Ethernet, video connection (e.g., digital video or IEEE 1394), and wireless networking protocols (e.g. 802.11). If the visual sensor 620 is an analog device (such as a composite video camera), the communications module 676 and 656 include a video card operative to digitize and store the incoming video frames.

The system 600 optionally comprises a communications link 640 for communicating image data and control data between the visual sensors 620 and the computing device 670. The communications link 640 may include a wired or wireless connection between the visual sensors 620 and the computing device 670, such as, for example, a digital video connection under the IEEE 1394 protocol, to enable real-time transmission of image data from the visual sensor 620. Alternatively, the communications link 640 may be as simple as an input device operative to read images stored on media by the visual sensor 620, such as, for example, a digital videotape created by a digital videotape recorder.

The computing device 670 optionally is coupled via the link 682 to one or more storage devices 678. The storage device 678 comprises computer storage media and may be used to store image date generated by the visual sensor 620. The computing device 670 optionally is coupled via the link 684 to one or more display devices 679. The storage device 678 comprises a standalone PC, a workstation, a dumb terminal, and may be used to view image data generated or used by the system 600. The links 682 and 684 may comprise a local connection or remote connection via a local area network, wide area network or the Web using protocols known to those of skill in the art.

The computing devices 670 and 651 may operate as one computing device in a standalone environment or in a networked environment using logical connections to one or more remote computing devices, which may be, by way of example, a server, a router, a network PC, personal computer, workstation, a hand-held device, a peer device or other common network node. All or part of the functionality of the computing devices 670 and 651 could be implemented in application specific integrated circuits, field programmable gate arrays or other special purpose hardware. In a networked environment, program modules depicted relative to the computing devices 670 and 651, or portions thereof, may be stored on one or more remote computing devices.

The system memory 674 and 654 stores the program and date instructions for implementing the methods described herein. The software implementation of the methods described herein may be encoded via conventional programming means known to those of ordinary skill in the art, e.g., Java language implementations. The methods described herein also may be implemented in commercially available numerical computing environment and programming language such as Matlab.

The platform 650 is adapted and configured to mount and/or transport the visual sensor(s) 620, with or without an on-board computing device 651. In another embodiment the platform 650 comprises one or more substructures, with the visual sensors 620 mounted on substructure and a computing device 651 mounted on another substructure. The platform 650 should be adapted and configured to monitor, store and update positioning and orientation parameters for the visual sensors 620. Exemplary platforms 650 include, for example, unmanned vehicles (e.g., airborne surveillance drones), satellites, maimed vehicles (e.g., cars, tanks, aircraft, spacecraft, submarines), robots, and a video camera mounted on an endoscope.

The system 600 optionally comprises a communications link 630 which uses communications media to communicating image data and control data between the visual sensors 620 and the computing device 651 on the platform 650. The communications link 630 may include a wired or wireless connection between the visual sensors 620 and the computing device 651, such as, for example, a digital video connection under the IEEE 1394 protocol, to enable real-time transmission of image data from the visual sensor 620. The system 600 optionally includes a communications link 660 which uses communication media to exchange image data and/or control information between the platform 650 and the computing device 670.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method of visually tracking targets in which full occlusions of the targets are encountered, comprising:
    identifying target regions in an image;
    assigning target regions with old tracks and assigning target regions with new tracks;
    detecting and identifying fully occluded tracks;
    modifying track discard rules for tracks identified as fully occluded that are unassigned to target regions in order to maintain the occluded tracks for a greater duration than tracks not identified as fully occluded that are unassigned to target regions;
    adjusting a motion model used to predict tracks identified as fully occluded to maintain the occluded tracks along a last observed path of the occluded tracks and gradually increase a prediction uncertainty; and
    deciding which tracks to maintain and which tracks to discard.

2. The method of claim 1, wherein the assigning step includes predicting a location in a current video frame that includes the image.

3. The method of claim 2, wherein predicting step predicts the location by approximating a location with an observation of a target's current position and applying a Kalman filter.

4. The method of claim 1, wherein the assigning step includes using a cost minimization algorithm.

5. The method of claim 1, further comprising processing all tracks to determine if the tracks are assigned target regions.

6. The method of claim 1, further comprising creating new tracks from unassigned target regions.

7. The method of claim 1, wherein the deciding step includes not assigning target regions to a target for N consecutive images before discarding the target if the target meets a minimum number of target regions.

8. The method of claim 7, wherein the deciding step includes immediately discarding a target upon not being assigned a target region if the target has less than the minimum number of target regions.

9. The method of claim 1, further comprising modifying algorithms used in the adjusting and deciding steps to increase the likelihood that a single track is maintained when a real target becomes temporarily occluded when supplemental range information is available.

10. The method of claim 9, wherein the range information is provided by computational stereo algorithms applied to stereo sensors.

11. A method of visually tracking targets in which occlusions of the targets are encountered, comprising:
    identifying target regions in an image;
    assigning target regions with old tracks and assigning target regions with new tracks;
    determining if a track is assigned a target region;
    if the track is assigned a target region, determining if the target region is partially occluded, and if yes, adjusting a centroid estimation; and
    if the track is not assigned a target region, identifying the track as fully occluded, determining if a predicted location is occluded, and modifying track discard rules for the track identified as fully occluded.

12. A system for visually tracking targets in which full occlusions of the targets are encountered, comprising:
    an input device for receiving an image;
    a memory comprising instructions for:
        identifying target regions in the image;
        assigning target regions with old tracks and assigning target regions with new tracks;
        detecting and identifying fully occluded tracks;
        modifying track discard rules for tracks identified as fully occluded that are unassigned to target regions in order to maintain the occluded tracks for a greater duration than tracks not identified as fully occluded that are of unassigned to target regions;
        adjusting a motion model used to predict tracks identified as fully occluded to maintain the occluded tracks along a last observed path of the occluded tracks and gradually increase a prediction uncertainty; and
        deciding which tracks to maintain and which tracks to discard; and
    a processor for executing the instructions.

13. A system for visually tracking targets in which occlusions of the targets are encountered, comprising:
    an input device for receiving an image;
    a memory comprising instructions for:
        identifying target regions in an image;
        assigning target regions with old tracks and assigning target regions with new tracks;
        determining if a track is assigned a target region;
        if the track is assigned a target region, determining if the target region is partially occluded, and if yes, adjusting a centroid estimation; and
        if the track is not assigned a target region, identifying the track as fully occluded, determining if a predicted location is occluded, and modifying track discard rules for the track identified as fully occluded; and
    a processor for executing the instructions.

14. A non-transitory computer readable medium for visually tracking targets in which occlusions of the targets are encountered, comprising instructions for performing the method of claim 1.

15. A non-transitory computer readable medium for visually tracking targets in which occlusions of the targets are encountered, comprising instructions for performing the method of claim 11.

* * * * *